United States Patent

[11] 3,607,988

| [72] | Inventors | Donald G. Gardner<br>Livermore, Calif.;<br>George A. Henry, Kingston, Jamaica West Indies |
|---|---|---|
| [21] | Appl. No. | 764,211 |
| [22] | Filed | Oct. 1, 1968 |
| [23] | | Continuation of Ser. No. 538,914, Mar. 28, 1966, abandoned |
| [45] | Patented | Sept. 21, 1971 |
| [73] | Assignee | The United States of America as represented by the United States Atomic Energy Commission |

[54] STEREOISOMERIC COMPLEX AS LIGHT-TRANSMISSIVE MEANS OF IMPROVED RESISTANCE TO RADIATION DAMAGE
3 Claims, 2 Drawing Figs.

[52] U.S. Cl. .................................................. 260/901,
252/300, 252/478, 260/898, 260/899
[51] Int. Cl. .................................................. C08f 29/50
[50] Field of Search .......................................... 260/901;
252/300, 478

[56] References Cited
UNITED STATES PATENTS
| 2,958,674 | 11/1960 | Arnold .......................... | 260/901 |
| 3,050,785 | 8/1962 | Cunningham ................ | 18/59 |

OTHER REFERENCES
Liquori, et al., Complementary Stereospecific---, Nature Vol. 206, pp. 358, 359, 360, 361, 362; (April 24, 1965)

*Primary Examiner*—Murray Tillman
*Assistant Examiner*—J. Seibert
*Attorney*—Roland A. Anderson

ABSTRACT: A solid polymer composition mixture of 60–75 percent syndiotactic polymer with 25–40 percent isotactic polymer produced from certain monomers of the type having an asymmetric structure and including polar substituent groups, and having improved resistance to radiation damage.

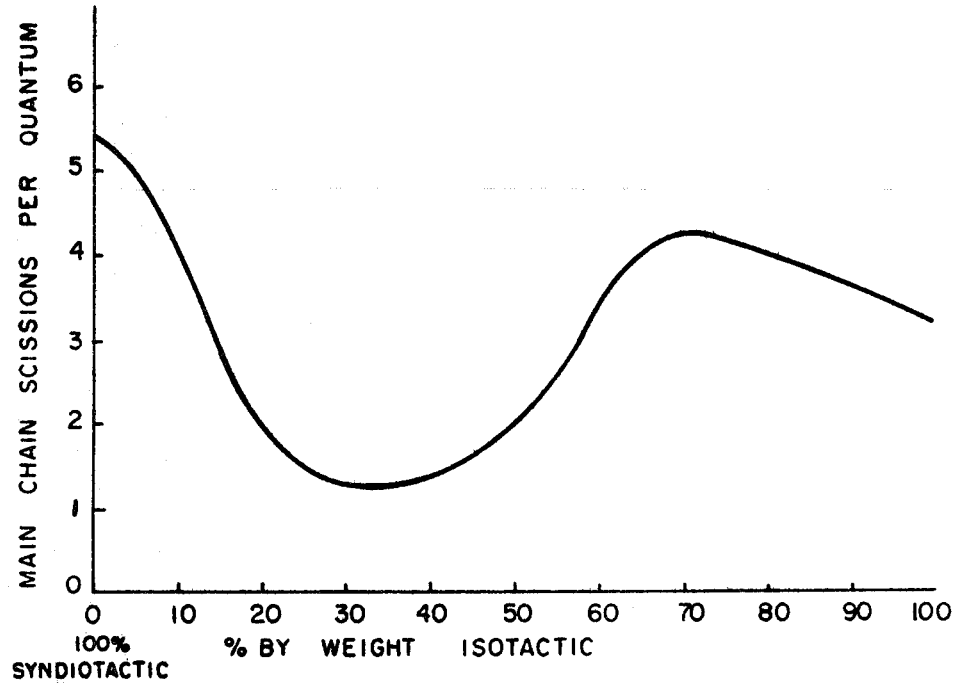
Fig. 1.a.
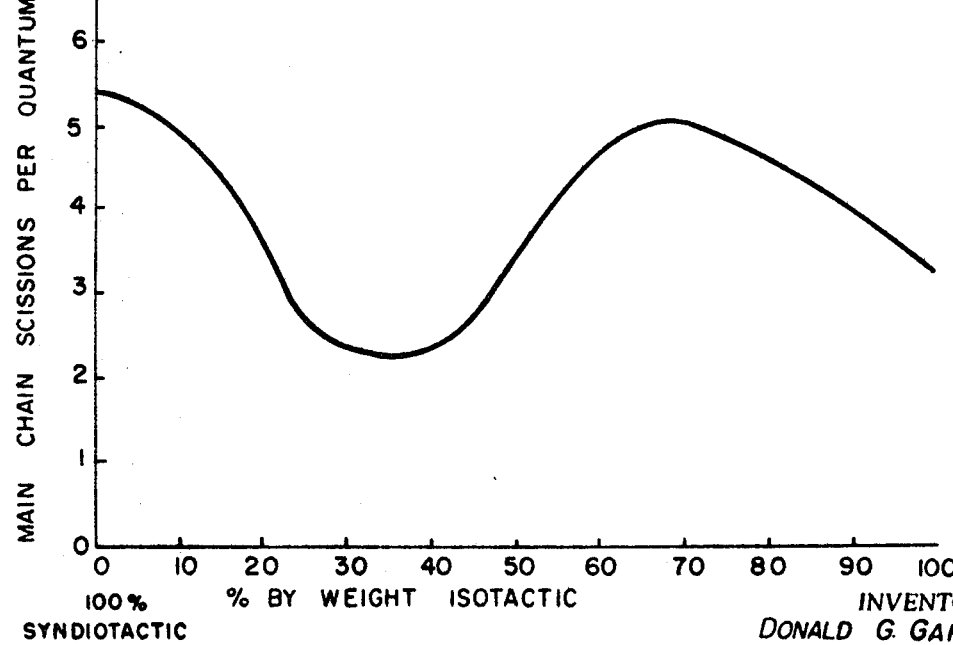
Fig. 1.b.
INVENTORS
DONALD G. GARDNER
GEORGE A. HENRY
BY
ATTORNEY

STEREOISOMERIC COMPLEX AS LIGHT-TRANSMISSIVE MEANS OF IMPROVED RESISTANCE TO RADIATION DAMAGE

This application is a continuation of abandoned U.S. Pat. application Ser. No. 538,914, filed Mar. 28, 1966, in the names of Donald G. Gardner and George A. Henry, for "Stereoisomeric Polymer Composition for Improved Resistance to Radiation Damage and Process for Making Same".

BACKGROUND OF THE INVENTION

The invention disclosed herein was made under, or in, the course of Contracts W-7405-ENG- 48 and AT(11-1) -1224 with the United States Atomic Energy Commission.

The present invention relates to polymer compositions having improved resistance to radiation degradation, and the method of making same. More particularly, the invention relates to stereoisomeric polymeric materials having a composition ratio of syndiotactic to isotactic isomers in intimate admixture providing unexpected resistance to radiation deterioration.

Polymers having an ordered arrangement of asymmetric monomers are termed "tactic" and include both syndiotactic and isotactic polymers. The term isotactic designates chains in which adjacent asymmetric carbon atoms have the same configuration, i.e., substituents to the chain are on one side of the carbon chain "axis." The term syndiotactic designates chains in which adjacent asymmetric carbon atoms have opposite configurations, i.e., substituents alternately to right or to left of the carbon chain "axis."

The present invention particularly contemplates resistance to radiation of the ultraviolet type, but the same resistive effect is considered to be effective with respect to electron radiation as well as, e.g., gamma and neutron radiation. Resistance of polymeric plastic fabrications to degradation by radiation has long been of great concern in the plastics industry. Ultraviolet light is a particular type of radiation which has been a very troublesome cause of degradation. Plastic components, e.g., film, sheet, molded shapes, etc., in such applications as automobile equipment, e.g., plastic windows on convertibles, molded parts, plastic containers, plastic film and optical components are particularly susceptible to radiation damage on prolonged exposure to sunlight. Radiation degradation is especially deleterious in transparent plastic components since the "yellowing" effect of radiation damage causes loss of transparency and discoloration cannot be "masked" with dyes or other colorants without an even more serious increase in opacity.

A major approach to decreasing radiation damage in the past has been the use of inhibitor additives of various types in the plastic formulation. For example, polynuclear aromatics or chemicals containing benzene rings are commonly added in varying quantities since the benzene rings tend to absorb the radiation, e.g., ultraviolet light, and convert it to heat energy which is comparatively nondestructive to the plastic. The use of additives which absorb and thermalize or degrade radiation has not been found entirely satisfactory.

Now it has been discovered that an unexpected and significant improvement of radiation resistance is conferred by appropriately selecting the ratio of syndiotactic to isotactic polymer components of the polymeric material itself, especially with the polyacrylic resin type polymers. By the present invention, the addition of materials which are, per se, not desirably included in the plastics composition may be avoided, although if so desired for even further enhancement of radiation degradation resistance characteristics, additives such as discussed above may be added to the present polymer blends by standard techniques. By avoiding inclusion of such additives, significantly better transmission of wide spectra light is possible — an effect which is of benefit in optical systems.

Solution mixtures, of a wide range of proportions, including syndiotactic and isotactic materials employed herein, have been known previously, e.g., "Complementary Stereospecific Interaction Between Isotactic and Syndiotactic Polymer Molecules" by A. M. Liquorie, G. Anzuino, et al., published in Nature, Apr. 24, 1965, Volume 206, pp. 358–362. However, it was disclosed therein that solutions of a certain concentration ratio of syndiotactic polymer and the polymer remainder of isotactic polymer demonstrated a markedly higher turbidity than solutions of other concentration ratios. Since this high turbidity is due to an increased light absorption capability for that particular composition range, it would normally be expected that such a polymer composition would be more susceptible to radiation damage simply because of the greater absorption. However, we have found that solid polymer forms produced in such a manner as to give an intimate interlocking or intertwined solid intermixture of the component polymers present in certain relative proportions, as taught by the present invention exhibit unexpectedly the opposite result, i.e., that these solid polymers exhibited a surprisingly high resistance to radiation degradation. Although the specific deterioration inhibiting mechanism which operates in the compositions of the present invention is not known, it is believed that interaction of the interwoven polymer chains somehow degrades the energy of the incident radiation photon or particle and of the secondary radiation and disperses the energy more harmlessly throughout the polymer mass.

SUMMARY OF THE INVENTION

Accordingly, it is an object of this invention to provide a plastic material comprising an intimate, intertwined admixture of selected stereospecific isomeric polymers having branched polar groups wherein a selected isomeric composition of the material itself provides exceptional characteristics comprising radiation degradation resistance and a method of producing same.

The invention possesses other objects and features of advantage which will be apparent from the following description and accompanying drawing, of which FIG. 1a illustrates the ultraviolet radiation resistance of polymethylmethacrylate for various stereospecific (syndiotactic-isotactic) polymer ratios, wherein a syndiotactic polymer was employed having approximately 80 percent of each molecular chain of syndiotactic structure; and FIG. 1b presents similar data with the exception that a syndiotactic polymer was employed having approximately 60 percent of each molecular chain of syndiotactic structure.

DESCRIPTION OF THE PREFERRED EMBODIMENTS

One method for producing the compositions of the present invention comprises freely dispersing and thoroughly blending a selected ratio of approximately 60–75 w/o (weight percent) syndiotactic component and correspondingly 40–25 w/o (weight percent) isotactic component corresponding to the syndiotactic and isotactic version of an asymmetric polymer having polar *side* groups, in a suitable solvent and then converting said polymer solution into a desired solid form. The present invention is applicable to producing a variety of thermoplastic resin materials in which the polymer chains are of molecular weights of approximately at least $10^3$ and to at least several orders of magnitude larger, e.g., up to at least $10^6$. Such lower molecular weights would generally correspond to molecular chains of the order of at least 10 monomer units.

The occurrence of cis and trans addition modes in asymmetric monomers has long been known. The stereospecific chain extension of such monomers to form both isotactic and syndiotactic polymer chains has been explored more recently with the advent of improved techniques such as infrared adsorption, X-ray diffraction and nuclear magnetic resonance techniques. General methods of preparing stereospecific polymers are now well known. For example, Progress in Stereochemistry, Volume 3, pages 264–270, published in 1962 by Butterworth, Inc. discusses methods of preparation of isotactic polymers based on the Ziegler-Natta catalyst type of process.

Standard techniques are well known and available for preparation of either syndiotactic or isotactic stereospecific polymers. For example, Goode et al. discloses a particular method for preparing isotactic polymers of methyl methacrylate in the Journal of Polymer Sciences, 1960, Volume 46, page 317. The method by which the present materials are prepared generally comprises catalyzation of a (water-free) monomer and maintaining a monomer at a selected low temperature to permit stereospecifically controlled polymerization. The preparation of syndiotactic polymers is well known and generally involves simple noncatalytic thermal polymerization of a (water-free) monomer under a controlled atmosphere.

Substantially syndiotactic and substantially isotactic polymer versions of a selected generic polymer category used in fabrication of a plastic film sheet or other structure can be prepared according to techniques fairly recent in origin, but well known and documented. For example, a technique for preparing solid isotactic polymers of methyl methacrylate is described in an article by W. E. Goode, F. H. Owens, et al. in the Journal of Polymer Science, Volume XLVI, 1960, pages 317–331 entitled "Crystalline Acrylic Polymers. I. Stereospecific Anionic Polymerization of Methyl Methacrylate."

It has been noted in preparing the materials of the present invention that best results are obtained when the stereospecific polymer blend is freely dispersed, i.e., in a large excess of solvent. This would suggest that the long polymer chains are given the greatest opportunity to assume an interwoven or interlocking relationship under these conditions.

In accordance with the above, the specific examples of the present invention provide for polymer dispersions in solvents comprising only approximately 3 percent by weight of polymer solids. However, generally, permissible limits of the content of polymer solids in a solvent will depend upon the particular polymer, tactic purity of the polymer, the molecular weight of the polymer and the particular solvent selected. Accordingly, it is anticipated that the advantages of the present invention may be realized, although possibly to a lesser degree, by polymer dispersions in solvents, at least, where the polymer solids content is as great as about 10–20 percent by weight in the solvent dispersion. It has further been noted that the radiation resistance effect of the present invention is further enhanced by preparing a solution of the stereospecific polymer blend in a polar solvent or a solvent combination comprising at least one polar solvent in admixture with a nonpolar solvent. By the same reasoning as above, it is believed that such a solvent further promotes the theoretically desired interrelation of the polymer chains, i.e., an intertwining or interlocking of the component isomeric polymers. The proportion of polymer blend which can be dissolved and thoroughly intermixed on a molecular intertwining basis depends on relative solubilities, solvation effects, rheology, etc. However, from about 2 to 10 parts by weight of polymer blend to solvent weight is generally suitable, with about 3 to 5 parts of weight being preferred. From the standpoint of economy, particularly for preparing molding powders, etc., high solids content is desirable and it is possible that energetic mixing techniques or elevated solution temperatures could promote intermixing of the molecules of the blends in solutions with contents above 10 parts by weight of polymer blend to 100 parts of solution. In any event, molecularly intermixed polymer blends prepared by whatever method should behave similarly for the purposes of the invention.

The present invention is generally applicable to polymers formed from asymmetric monomers having a polar side group. Such polymers are subject to molecularly intertwined arrangement as discussed above, and, on preparation in the isomeric ratio disclosed herein, exhibit the surprising effect of enhanced resistance to radiation degradation. Examples of such polymers include polysubstituted acrylates including polymethylmethacrylate, polyisopropyl methacrylate (as well as other polymethacrylates), polymethacrylamide, polymethacrylic acid, polyacrylamide, polyacrylic acid, polyacrylonitrile, polyvinyl alkyl ethers, polyvinyl methyl ketone, polyvinyl chloride, polyvinyl acetate, poly alphamethylstyrene with a polar group substituted upon the benzene ring (e.g. poly-p-chloro-α-methylstyrene) etc. The general requirements for the above polymers are that they be unsymmetrical so that the individual syndiotactic and isotactic stereoisomers can be produced for appropriate blending, and that part of the monomer unit be at least somewhat polar. In such polymers, a molecular weight of approximately $10^3$ (1000) is a minimum for usable finished solid plastic fabricated part properties. It is also to be noted that as the molecular weight of the side chain increases the ability to assume the interwoven relation of the molecules (as discussed above) is present to a lesser degree and the resistance to radiation degradation may correspondingly decrease. Suitable solvents for use in blending the above polymers include, for example, benzene, acetone or methyl ethyl ketone. In accord with the preferred embodiment of the present invention, suitable polar solvents include methylene chloride, dimethylformamide and acetonitrile.

In accord with the above definition, a preferred embodiment of the improved polymer structure and the method of preparing same are described below.

A solution of a selected blended ratio of stereospecific polymers content is prepared from which to form a desired plastic structure by, for example, casting films from the solution by evaporation. The dried blended solid polymer can also be fragmented for forming in the conventional manner by extrusion, molding, etc. It has been found that improved radiation resistance properties are achieved by dispersing the polymers in an excess of solvent whereby the theorized advantage of free intermingling of the polymers is achieved as discussed supra. For example, stereospecific methyl methacrylate polymer powder mixture (of the molecular weight order of $10^3$ (1000) or greater) of approximately 60–75 parts by weight of syndiotactic polymer and 40–25 parts by weight of isotactic polymer is preferably dispersed with stirring or agitation if necessary in approximately 3,000 parts by weight of methylene chloride. With higher concentrations, moderate heating may accelerate dissolution.

A desired plastic structure is formed from the above polymer blend solution by, for example, simple solvent evaporation. The methyl-methacrylate polymer blend solution, supra, is cast into a film by standard techniques, for example, by simple solvent evaporation from an appropriate thickness of the solution deposited on either a glass or water surface. The resulting plastic film structure has been found to have a surprisingly increased resistance to radiation degradation. For example, polymethyl methacrylate film having approximately 60–70 weight percent of syndiotactic molecules and 30–40 weight percent of isotactic molecules demonstrates a resistance to deterioration by ultraviolet radiation which is greater than the resistance of either stereospecific molecular form alone or of other combinations of the two. Although methyl methacrylate plastics are known to have excellent resistance characteristics to degradation effects of ultraviolet light, the present invention teaches a method of even further enhancing that desirable property, particularly without requiring addition of inhibitors or utilizing extraneous polymer blends.

The improvement of ultraviolet resistance is noted in FIG. 1a. Polymethyl methacrylate films having various ratios of syndiotactic and isotactic isomers were exposed to ultraviolet light having a wavelength (λ) substantially equal to 2,537 angstroms. The number of main chain scissions was determined per quantum of radiation by standard viscosity molecular weight techniques. Such a value inversely corresponds to the resistance of the polymer material to ultraviolet radiation degradation. From the prior art, it would be expected that the curve would be a generally straight line between the values for pure syndiotactic polymer and pure isotactic polymer. However, FIG. 1a illustrates an unexpected characteristic in that a polymer blend which is approximately 66-2/3 percent of syndiotactic and 33-1/3 percent isotactic exhibits a resistance to ultraviolet radiation degradation substantially higher than either pure tactic isomer polymer form alone. In comparing FIGS. 1a and 1b, the curve of FIG. 1a was obtained with a film of approximately 0.001 inch thickness comprising a syndiotactic polymer in the blended polymer in which the molecular chain comprised approximately 80 percent syndiotactic structure interspersed with the remainder of isotactic or random structure. The curve of FIG. 1b was similarly obtained, but with a syndiotactic polymer comprising only approximately 60 percent syndiotactic structure. The maximum radiation resistance illustrated by the two curves for the preferred polymer ratio of the present invention illustrates the desirability of utilizing polymer components the molecular chains of each of which are of substantially a single tactic form.

In addition to simply enhancing the radiation resistance of methyl methacrylate plastics, a further important advantage is obtained. An "optimization" of film properties may now be achieved. For example, referring to FIG. 1, it is noted that the isotactic form of methyl methacrylate provides considerably better resistance to ultraviolet degradation than the syndiotactic form. It is already known that films prepared from the syndiotactic polymer have substantially greater transparency than isotactic polymers. Thus, whereas in the prior art, it was necessary to reach a compromise between these two important characteristics in the composition, the present invention teaches a method whereby the higher transparency of the syndiotactic polymer is maintained to a substantial degree since it is present as 60–70 percent of the finished film. In addition, the ultraviolet degradation resistance is synergistically greater than for either the syndiotactic or isotactic polymer alone.

Further details of the practice of the invention will be set forth in the following examples:

EXAMPLE I.

A POLYMETHYL METHACRYLATE FILM OF SELECTED STEREOSPECIFIC POLYMERIC COMPOSITION

Syndiotactic and isotactic polymers were respectively and separately prepared according to Goode et al., supra, from methyl methacrylate monomer, supra. Isotactic methyl methacrylate polymer, as used herein, was prepared according to method (A.) on page 320 of the article by Goode et al., with one exception. Whereas Goode thermally polymerized the monomer at −40° C., the present polymer was polymerized at approximately 0° C.

The syndiotactic methyl methacrylate polymer contemplated in Example I was prepared according to the following standard technique. Commercially available monomer containing small amounts of inhibitor was fractionally distilled to remove the inhibitor. The resulting monomer was sealed in an evacuated glass tube and alternately frozen and thawed (with simultaneous vacuum pumping) to remove oxygen present in the monomer. The purified monomer was again sealed in a glass tube overlayered with nitrogen and disposed in an oil bath maintained at 60° C. to form a syndiotactic polymer. Although it was desired to employ molecules of substantially pure syndiotactic or isotactic chain structure, only the isotactic polymer, as employed, was substantially of a single form. The syndiotactic polymer, as prepared, was examined by magnetic resonance techniques and it was found that the molecular chains of that polymer were only approximately 70–80 percent syndiotactic apparently interspersed along each of the molecular chains with the remainder being mainly random in form. The molecular weight of the syndiotactic polymer was approximately $10^6$ and the isotactic was of approximately $10^5$ molecular weight.

A polymer blend solution was prepared by dispersing 66-⅔ parts by weight of syndiotactic polymer and 33-⅓ parts by weight of isotactic polymer in 3,300 parts by weight of methylene chloride solvent, i.e., the dispersion was formed by shaking the polymer-solvent mixture at approximately room temperature. A film of polymethylmethacrylate was formed by evaporating the methylene chloride from the polymer solution deposited as a layer (1 mg. of polymer solids per sq. in.) over a glass substrate.

EXAMPLE II.

A POLYISOPROPYL METHACRYLATE FILM OF SELECTED STEREOSPECIFIC COMPOSITION

Syndiotactic and isotactic polymers of polyisopropyl methacrylate were prepared as described in Example I. Said polymers were dispersed and formed into a film according to the method of Example I.

EXAMPLE III.

A POLYACRYLONITRILE FILM OF SELECTED STEREOSPECIFIC COMPOSITION

Syndiotactic and isotactic polymers of polyacrylonitrile are prepared as described in Example I. Said polymers are dispersed and formed into a film according to the method of Example I.

EXAMPLE IV.

A POLYVINYL CHLORIDE FILM OF SELECTED STEREOSPECIFIC COMPOSITION

Syndiotactic and isotactic polymers of polyvinyl chloride are prepared as described in Example I. Said polymers are dispersed and formed into a film according to the method of Example I.

Although the present invention has been particularly described with reference to a single preferred embodiment, it is to be noted that numerous modifications or variations are possible. For example, whereas it is above contemplated to combine syndiotactic and isotactic polymers of the same polymer, it is also possible to combine a syndiotactic polymer of a first polymeric type with an isotactic polymer of a second polymeric type to further enhance the properties of the finished structure.

Further, it is particularly contemplated above to disperse separately prepared syndiotactic and isotactic polymers in a suitable solvent and form a structural plastic form therefrom. However, it is also contemplated that one can prepare the isotactic polymer as described above and disperse that polymer in monomer of the same type together with a suitable solvent, for example, methylene chloride. By placing the resultant dispersion at conditions suitable for syndiotactic polymerization, syndiotactic polymer may be formed in situ. Further, isotactic polymerization would not occur because the conditions are suitable only for syndiotactic polymerization. Likewise, syndiotactic polymer may be prepared as described above and dispersed in monomer of the same type and a solvent. Isotactic polymerization may then be carried out in situ by placing the monomer dispersion in conditions, as described supra, suitable for isotactic polymerization. Either of the procedures described above provides a procedure adapted to large scale commercial type processes by which the intimately interwoven blend of polymers is to be achieved. Accordingly, it is to be clearly understood that the same is by way of example only and is not to be taken by way of limitation, the spirit and scope of this invention being limited only by the terms of the appended claims.

1. A method for providing a means for substantially transparently transmitting visible light while sustaining irradiation by ultraviolet light which comprises the use, as such a light transmissive means sustaining irradiation by ultraviolet light, of a sheet consisting essentially of a structurally solid intimate admixture of approximately 60–75 percent by weight of substantially syndiotactic polymethyl methacrylate polymer with approximately 40–25 percent by weight of substantially isotactic polymethyl methacrylate polymer with the molecules of said syndiotactic polymer being intimately intertwined with the molecules of said isotactic polymers having a molecular weight of at least approximately $10^3$, thereby affording enhanced retention of substantial transparency for visible light while sustaining irradiation by ultraviolet light.

2. The method of claim 1, wherein said syndiotactic polymethyl methacrylate has a molecular weight of the order of $10^6$, and said isotactic polymethyl methacrylate has a molecular weight of the order of $10^5$.

3. The method of claim 2, wherein the syndiotactic polymethyl methacrylate polymer comprises substantially 66-⅔ by weight, and the isotactic polymethyl methacrylate polymer comprises substantially 33-⅓ by weight of said mixture.